United States Patent [19]
Kästel et al.

[11] Patent Number: 4,640,135
[45] Date of Patent: Feb. 3, 1987

[54] SENSOR

[75] Inventors: Walter Kästel, Steinen; Wolfgang Geiger, Schopfheim, both of Fed. Rep. of Germany

[73] Assignee: Endress u. Hauser GmbH u. Co., Fed. Rep. of Germany

[21] Appl. No.: 745,282

[22] Filed: Jun. 14, 1985

[30] Foreign Application Priority Data

Jun. 20, 1984 [DE] Fed. Rep. of Germany ....... 3422945

[51] Int. Cl.⁴ .............................................. G01L 7/08
[52] U.S. Cl. ...................................... 73/716; 73/706; 92/81; 92/97; 92/110
[58] Field of Search ................. 73/715, 706, 723, 724, 73/725, 726, 727, 728, 729, 716, 717, 718, 719, 720, 721, 722; 92/97, 81, 110

[56] References Cited
U.S. PATENT DOCUMENTS 2,177,564 10/1939 Havill .................................... 73/729
2,203,460 6/1940 Fieber .................................... 73/716

Primary Examiner—Donald O. Woodiel
Attorney, Agent, or Firm—Barnes & Thornburg

[57] ABSTRACT

A pressure sensor has a housing in which at least two diaphragms are secured in such a manner that they include a volume which is filled with a hydraulic fluid. The incompressible hydraulic fluid serves to transmit pressure between the diaphragms. For introducing the hydraulic fluid one diaphragm is provided with an opening. A narrow tube is connected in fluid-tight manner to the edge of the opening. The hydraulic fluid is introduced through the initially still open end of the narrow tube. After the filling with hydraulic fluid the open end of the narrow tube is sealed in fluid-tight manner, for example by squeezing. The narrow tube can serve at the same time a force-transmitting or travel-transmitting member which connects the diaphragm to a force or travel sensor.

12 Claims, 2 Drawing Figures

SENSOR

The invention relates to a sensor comprising a housing and at least two diaphragms which enclose a volume filled with a hydraulic fluid.

Sensors of this type are used in particular as pressure sensors, the pressure transmission between the diaphragms taking place hydraulically by means of an incompressible fluid. This construction is advantageous for several reasons. In simple pressure sensors only one of the two diaphragms is in contact with the medium whose pressure is to be measured whilst the other diaphragm is separate from the medium and forms the measuring diaphragm. The two diaphragms may be made with different cross-sectional area, giving a force or travel conversion. In the case of differential pressure sensors the two pressures whose difference is to be measured each act on one of the diaphragms.

In known pressure sensors of this type the introduction of the hydraulic fluid is generally through a filling passage which is formed in the housing and which after filling is sealed by means of a ball and screw, by an expander seal or in similar manner. This solution is complicated and in many uses not applicable or unfavourable, especially since the filling point must lie higher than the highest oil level between the diaphragms. The introduction of the hydraulic fluid must take place from outside the housing, i.e. from a point at which the pressure sensor is screwed in, pressed in or secured in other manner, and consequently this point is not accessible in the installed condition. Furthermore, the point at which the filling passage is disposed is frequently in contact with the measurement medium so that the filling passage or its closure are subjected to a risk of corrosion. In many cases it is also not even possible to attach a lateral passage at the housing of the pressure sensor or arrange the filling passage in such a manner that introduction of the hydraulic fluid is possible without any danger of air inclusions.

The problem underlying the invention is the provision of a sensor of the type mentioned at the beginning with a very simple means, easily accessible even under difficult installation conditions, for introducing the hydraulic fluid without any risk of air inclusions.

According to the invention this problem is solved in that for introducing the hydraulic fluid a diaphragm is provided with an opening and that a narrow tube is connected in fluid-tight manner with the edge of the opening.

The sensor according to the invention differs from known pressure sensors fundamentally in that the means for introducing the hydraulic fluid is not attached to the housing but to one of the diaphragms. This is possible without impairing the function and stability of the diaphragm in particular if the narrow tube is disposed in the centre zone of the diaphragm which is subjected to little mechanical stress. In simple pressure sensors the narrow tube is preferably attached to the measuring diaphragm which is not in contact with the measured medium so that it is protected from corrosion and lies on the side of the pressure sensor remote from the measured medium, where it is easily accessible. The means for introducing the hydraulic fluid is very simple and cheap because it requires no mechanical machining of the housing and no complicated closure members. An important advantage resides in that the oil introduction point lies fundamentally over the highest point of the oil chamber. The pressure sensor according to the invention has the additional advantage that the narrow tube can be used as a force-transmitting or travel-transmitting member.

Advantageous embodiments and further developments of the invention are characterized in the subsidiary claims.

Further advantages and features of the invention will be apparent from the following description of an example of embodiment illustrated in the drawings, wherein.

Figure 1:
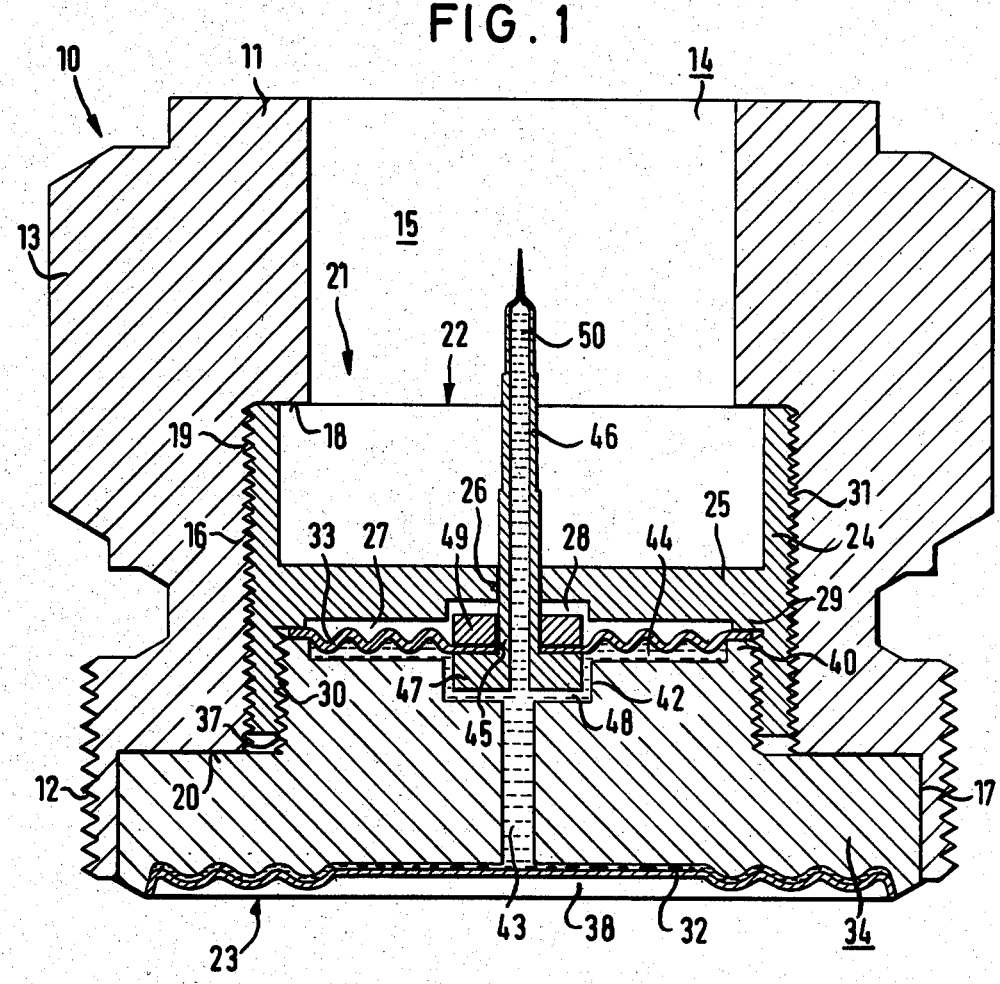
FIG. 1 is a section through a pressure sensor according to the invention.

The drawings show as example a pressure sensor 10 whose housing is constructed as screw-in member 11. The lower cylindrical portion of the screw-in member 11 is provided with an external thread 12 with which the screw-in member 11 can be screwed into a threaded opening in the wall of a container in which the measured medium whose pressure is to be measured by means of the pressure sensor is disposed. The upper portion of the screw-in member 11 is constructed as hexagon 13 for engagement with a spanner. The terms "lower" and "upper" relate only to the illustration in the drawings; the pressure sensor can be installed in any desired position and in every case the hexagon 13 lies outside the container and the lower end face of the screw-in member 11 faces the container interior.

Figure 2:
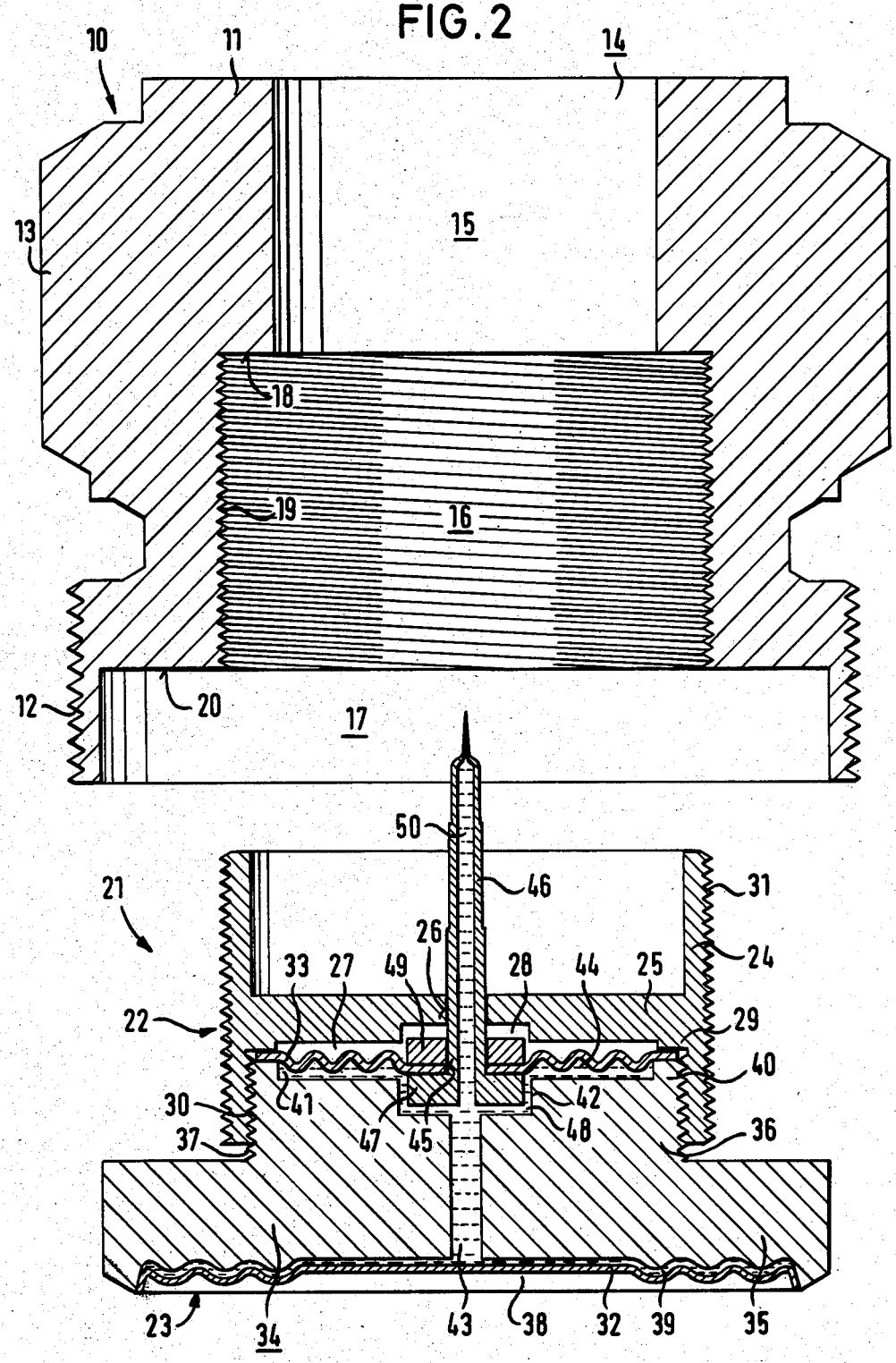
FIG. 2 shows the two main parts of the pressure sensor of FIG. 1 prior to assembly.

Formed in the screw-in member 11 is an axially through central recess 14 which consists of three sections 15, 16 and 17 of different diameter (FIG. 2). The upper section 15 is cylindrical with smooth peripheral wall and extends from the upper end face over more than one-third of the height of the screw-in member 11 and thus over more than half the height of the hexagonal section 13. This is followed by the cylindrical section 16 which has a somewhat greater diameter so that between the sections 15 and 16 an annular shoulder 18 is formed. The peripheral wall of the section 16 is provided with an internal thread 19. The section 16 has a somewhat greater axial extent than the section 15 so that it extends approximately up to the height of the centre of the thread 12. The lower portion 17 of the recess 14 which occupies the remaining part of the screw-in member 11 up to the lower end face thereof has a substantially smaller height than each of the sections 15 and 16 but a considerably greater diameter than the section 16 so that between the two sections 16 and 17 a relatively wide annular shoulder 20 is formed.

Screwed into the internal thread 19 of the centre section 16 is an insert 21 which occupies substantially the sections 16 and 17 of the recess 14 and closes the passage formed through the screw-in member 11 by the recess 14 in pressure-tight manner. The insert 21 consists substantially of a screw socket 22 and an oil buffer 23 screwed into the screw socket 22. The screw socket 22 has a cylindrical peripheral wall 24 and a diametrical partition 25 which divides the interior of the screw socket into two unequal sections. A cylindrical bore 26 traverses the partition 25 coaxially to the axis of the screw socket 22. At the lower side of the partition 25 coaxially to the bore 26 a flat cylindrical recess 27 is formed which comprises in the centre a cylindrical depression 28. The diameter of the recess 27 is so large that only an annular shoulder 29 of small width runs round the edge of the lower side of the partition 25. The inner face of the peripheral wall 24 of the screw socket 22 extending downwardly from the shoulder 29 is provided with an internal thread 30. The outer face of the peripheral wall 24 is provided over its entire height with an exernal thread 31 adapted to be screwed into the internal thread 19 of the section 16.

The oil buffer 23 consists substantially of two corrugated diaphragms 32 and 33 with an intermediate body 34 disposed therebetween. The intermediate body 34 is a solid metal part having two cylindrical sections 35 and 36 of different diameter. The lower cylindrical section 35 of the intermediate body 34 is adapted in circumference and height exactly to the lowermost section 17 of the central recess 14. The cylindrical section 35 of smaller diameter following in the upward direction has an external thread 37 which is adapted to be screwed into the internal thread 30 of the screw socket 22.

Formed at the lower end face of the intermediate body 34 facing the interior of the container is a flat recess 38. The corrugated diaphragm 32 is disposed in the flat recess 38 and at the edge of the recess welded in pressure-tight manner to the intermediate body 34. The recess 38 is adapted to the form of the corrugated diaphragm 33 so that at all points only a narrow intermediate space 39 is present between the diaphragm 33 and the bottom of the flat recess 38.

Formed round the periphery of the opposite end face of the intermediate body 34 facing the screw socket 22 is a narrow annular shoulder 40 which lies opposite the shoulder 29 and surrounds a flat cylindrical recess 41. Formed in the centre of the recess 40 is a cylindrical depression 42 which lies opposite the depression 28 and has substantially the same diameter as the latter. Traversing the intermediate body 34 is an axial passage 43 which establishes the connection between the flat recess 38 at the lower side and the depression 42 at the upper side of the intermediate body.

The edge of the corrugated diaphragm 33 lies between the shoulder 29 of the screw socket 22 and the shoulder 40 of the intermediate body 34 and is clamped in pressure-tight manner by the screwing of the two parts. The undulations of the diaphragm 33 lie in the cavity which is formed by the flat recesses 27 and 41 and which is made large enough to accommodate the stroke movements of the diaphragm. The recesses 27 and 41 may also be adapted to the form of the diaphragm 33 as is the case with the recess 38 at the lower side of the intermediate body 34. In any case, between the diaphragm 33 and the bottom of the flat recess 41 there is only a narrow intermediate space 44 which is connected via the axial passage 43 to the intermediate space 39 at the lower side of the intermediate body 34.

Formed in the centre point of the diaphragm 33 is a circular opening 45 through which a narrow tube 46 is placed. The narrow tube 46 is formed by a small metal tube at the lower end of which a disc-shaped collar 47 is integrally formed. In the assembled state the collar 47 lies in the depression 42 of the intermediate body 34 and almost completely fills said depression so that only a narrow intermediate space 48 remains between the walls of the depression 42 and the disc-shaped collar 47. The upper side of the collar 47 is connected by an adhesive to the lower side of the planar uncorrugated inner annular region of the diaphragm 33, the so-called "eye". A ring 49 pushed from above over the narrow tube 46 is connected by an adhesive to the opposite side of the diaphragm 32. In the assembled state the ring 49 is received by the depression 28 in the partition 25. In combination with an exact working of the outer surface of the narrow tube 46 which is in very close fit in the opening 45 of the diaphragm 33 this results in a very secure and completely pressure-tight mounting of the narrow tube 46 on the diaphragm 33. The collar 47 and the opposite ring 49 gives the central portion of the diaphragm, the so-called "eye", a stiffening so that for this reason alone it is no longer part of the resilient portion of the diaphragm.

The narrow tube 46 is led through the bore 26 of the partition 25 and the length of said tube is such that it extends beyond the screw socket 22 into the uppermost portion 15 of the central recess 14 when the pressure sensor 10 is assembled (FIG. 1). The upper end of the narrow tube 46 is sealed in pressure-tight manner by squeezing.

The volume enclosed by the two diaphragms 32 and 33, the intermediate body 34 and the narrow tube 46 is completely filled with an incompressible hydraulic fluid 50. The hydraulic fluid 50 serves to transmit pressure between the two diaphragms 32 and 33. The diaphragm 32 is in contact with the measured medium which is disposed in the container and the pressure of which is to be measured. The pressure exerted by the measured medium on the diaphragm 32 is transmitted by the hydraulic fluid 50 to the diaphragm 33. The diaphragm 33 is connected via the narrow tube 46 to a force or travel sensor (not shown) which furnishes a signal which is either proportional to the force exerted on the diaphragm 33 or to the deflection of said diaphragm 33. This signal thus indicates the pressure obtaining in the container.

The hydraulic fluid 50 cannot be introduced until the insert 21 has been completely assembled. The filling must be such that no air inclusions remain. This is made possible by the narrow tube 46 which thus fulfils the double function of a filling connection and a force-transmitting or travel-transmitting member (push member).

Assembly of the pressure sensor illustrated and described as example of embodiment is particularly simple and economical. Firstly, the two diaphragm modules are prepared. For this purpose, the diaphragm 32 is inserted into the intermediate body 34 and the edge of the diaphragm 32 is welded to the periphery of the flat recess 38. The narrow tube 46 which is still open at the upper end is pushed through the opening 45 of the diaphragm 33 and the collar 47 and the ring 49 are adhered to the diaphragm 33. The narrow tube 46 is then inserted through the bore 26 of the partition 25 until the edge of the diaphragm 33 bears on the shoulder 29. Thereafter, the external thread 37 of the intermediate body 34 is screwed into the internal thread 30 of the screw socket 22 and tightened so that the edge of the diaphragm 33 is clamped in pressure-tight manner between the shoulders 29 and 49. The hydraulic fluid 50 can now be introduced through the open upper end of the narrow tube 46 until the entire enclosed volume defined by the intermediate spaces 39, 44 and 48, the axial passage 43 and the hollow interior of the tube 46 is filled. This is done under vacuum. Firstly, the insert 21 is held in a special means so that the open end of the narrow tube 46 is at the top, i.e. at the highest position of the enclosed volume. The means is then evacuated and the hydraulic fluid introduced. When the hydraulic fluid has reached the upper end of the narrow tube 46 the closed space is opened and the narrow tube 46 sealed in pressure-tight manner. This can be done as illustrated in the drawings by squeezing but alternatively by soldering, welding, an adhesive or insertion of a closure plug or stopper.

The insert 21 formed in this manner is finally installed with the aid of the threads 19 and 31 in the screw-in member 11, the pressure sensor 10 thus being completed and having the final form illustrated in FIG. 1.

The narrow tube 47 lies at a protected point of the pressure sensor and is not contacted by the medium being measured so that it is not exposed to any danger of corrosion when the pressure sensor is used for measuring the pressure of a corrosive medium.

The embodiment described can of course be modified in various ways. Thus, instead of by an adhesive the narrow tube 46 can be secured in another manner pressure-tight to the diaphragm 33, for example by soldering, welding, etc.

Although it is advantageous to use the narrow tube 46 as force-transmitting or travel-transmitting member, it is also advantageous to provide the narrow tube as filling connection in cases where the transmission of the measured value (force or travel) is done in some other manner.

The construction of the pressure sensor described is of course independent of the form of the housing and number of diaphragms used. It is for example also applicable to differential pressure sensors in which more than two diaphragms are in contact with the hydraulic fluid in the sealed volume.

We claim:

1. A sensor comprising a housing having at least two diaphragms supported therein which enclose a volume filled with hydraulic fluid, one of said diaphragms having an opening, and a narrow tube connected to said diaphragm with the opening in a fluid tight manner around the edge of the opening to permit hydraulic fluid to be introduced into the volume and for serving as a force-transmitting or travel-transmitting member for connecting the diaphragm with the opening to a force or travel sensor.

2. A sensor according to claim 1 wherein the opening is formed in the centre zone of the diaphragm having the opening.

3. A sensor according to claim 1 wherein the narrow tube is formed by a small metal tube.

4. A sensor according to claim 1 wherein the narrow tube has an annular collar which is sealingly connected to the diaphragm having the opening.

5. A sensor according to claim 4 wherein the side of the diaphragm having the opening which is opposite the collar has a ring surrounding the narrow tube, the ring sealingly connected to the diaphragm having the opening.

6. A sensor according to claim 1 wherein the narrow tube is connected to the diaphragm having the opening by soldering, welding or by means of an adhesive.

7. A sensor according to claim 1 wherein an end of the narrow tube remote from the diaphragm having the opening is sealed by squeezing, soldering or welding.

8. A sensor according to claim 1 wherein the housing is constructed as a screw-in member with a thread for screwing into a threaded opening of a container wall, the screw-in member including an axially through central recess and the two diaphragms are disposed in an insert arranged in the central recess.

9. A sensor according to claim 8 wherein the housing includes an intermediate body having first and second opposed ends, each of the first and second opposed ends having an axially outwardly facing flat recess, the intermediate body having a passage extending therethrough for connecting the flat recesses, each of the opposed ends of the intermediate body having one of said diaphragms secured in its recess to an outer surface in a pressure-tight manner to form a narrow intermediate space between an inner surface of the diaphragm and the outer surface of the opposed end.

10. A sensor according to claim 9 wherein at least one of the diaphragms is welded along its edge to the intermediate body.

11. A sensor according to claim 9 wherein the insert comprises a screw socket into which the intermediate body is adapted to be screwed, the edge of the diaphragm remote from the container being clamped between the intermediate body and the screw socket.

12. A sensor according to claim 11 wherein the screw socket is adapted to be screwed into the screw-in member.

* * * * *

UNITED STATES PATENT AND TRADEMARK OFFICE
CERTIFICATE OF CORRECTION

PATENT NO. : 4,640,135

DATED : February 3, 1987

INVENTOR(S) : Walter Kastel and Wolfgang Geiger

It is certified that error appears in the above-identified patent and that said Letters Patent is hereby corrected as shown below:

On the bibliography page, "References Cited", please add the following:

--3,202,063    8/1965    Bissell    92/91

FOREIGN PATENT DOCUMENTS 840,290    6/1960    British--.

Signed and Sealed this

Twenty-ninth Day of September, 1987

Attest:

DONALD J. QUIGG

Attesting Officer    Commissioner of Patents and Trademarks